No. 716,552. Patented Dec. 23, 1902.
D. D. JOLLY & A. E. FIRMAN.
HARVESTING CORN.
(Application filed July 9, 1901.)
(No Model.) 3 Sheets—Sheet 2.

No. 716,552. Patented Dec. 23, 1902.
D. D. JOLLY & A. E. FIRMAN.
HARVESTING CORN.
(Application filed July 9, 1901.)
(No Model.) 3 Sheets—Sheet 3.
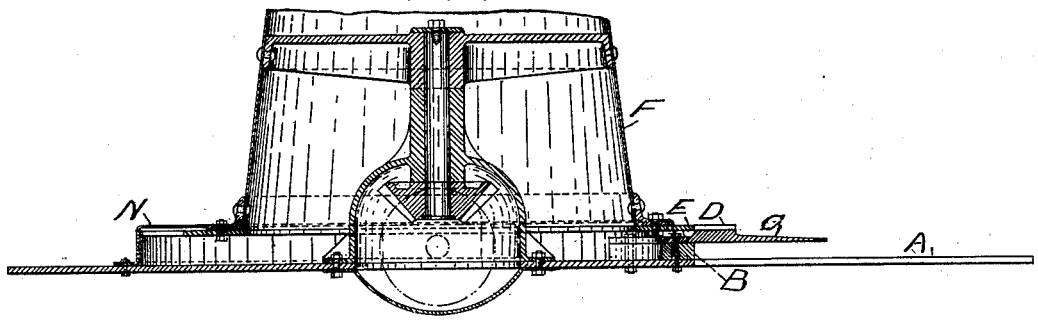
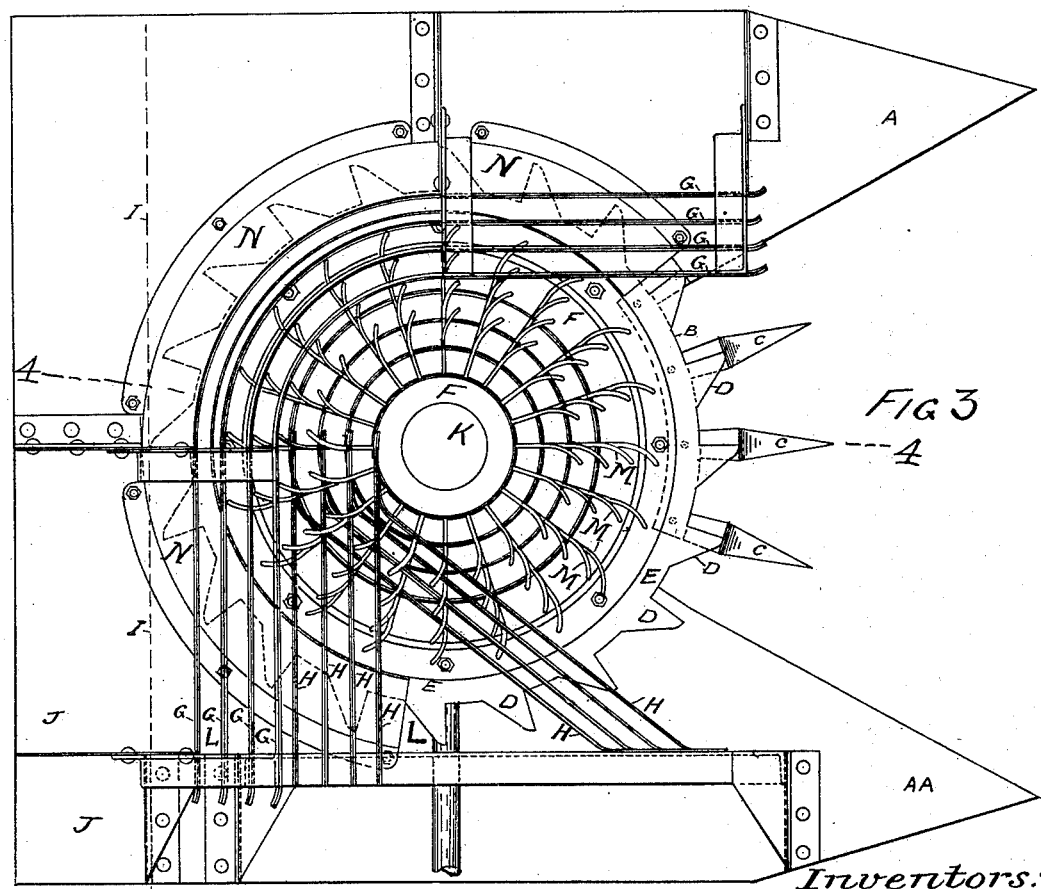
Witnesses:
E. B. Bolton
Isabella Waldron
Inventors:
David Dallas Jolly
Ascot Ernest Firman
By Richard
their Attorney

UNITED STATES PATENT OFFICE.

DAVID DALLAS JOLLY AND ASCOT ERNEST FIRMAN, OF CAPE TOWN, CAPE COLONY.

HARVESTING CORN.

SPECIFICATION forming part of Letters Patent No. 716,552, dated December 23, 1902.

Application filed July 9, 1901. Serial No. 67,615. (No model.)

*To all whom it may concern:*

Be it known that we, DAVID DALLAS JOLLY and ASCOT ERNEST FIRMAN, British subjects, residing in Cape Town, Cape Colony, have invented certain new and useful Improvements for Harvesting Corn, of which the following is a specification.

The object of the invention is to provide a new machine for reaping corn of simple and durable construction and efficient in operation.

Figure 1:
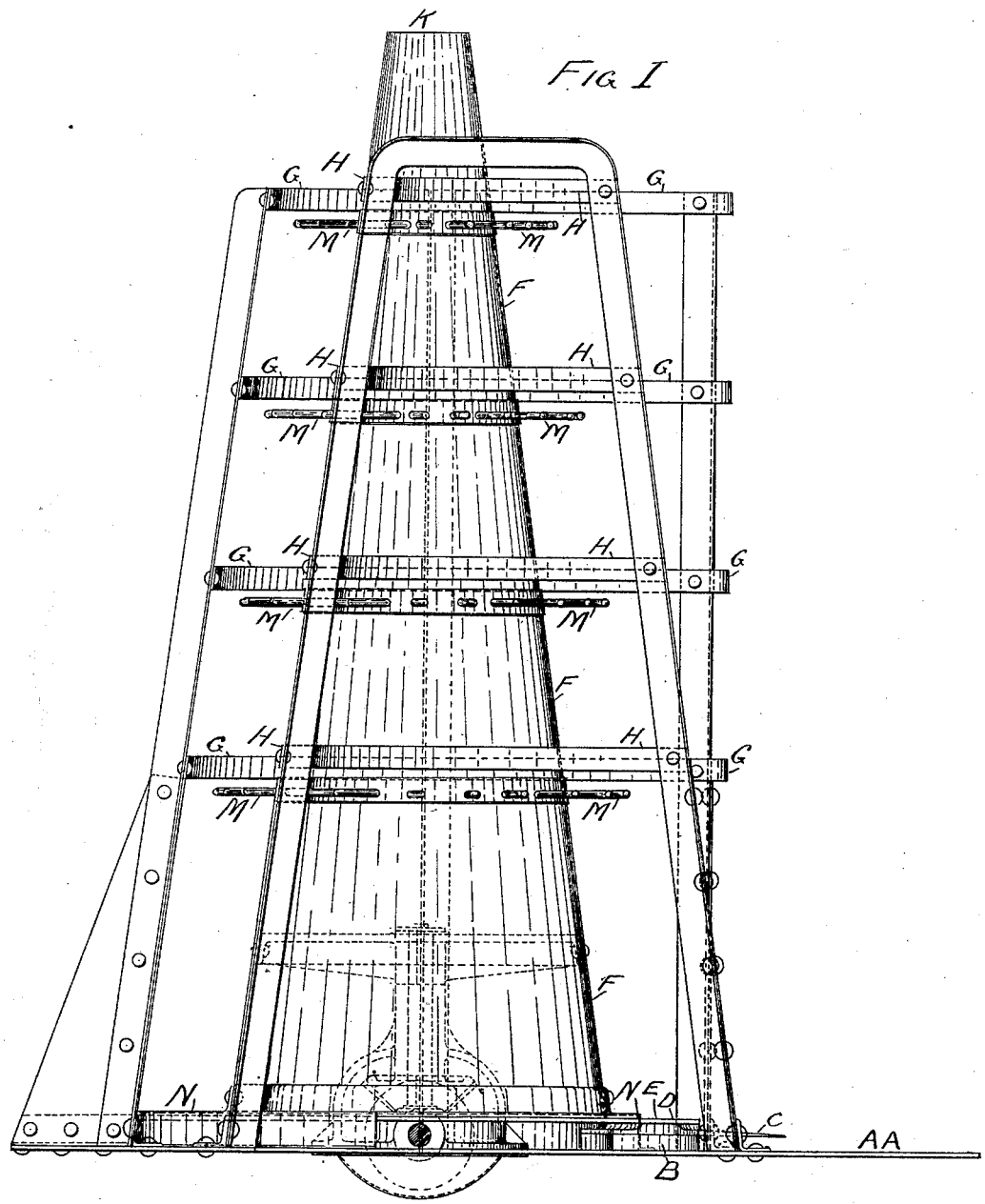
Figure 2:
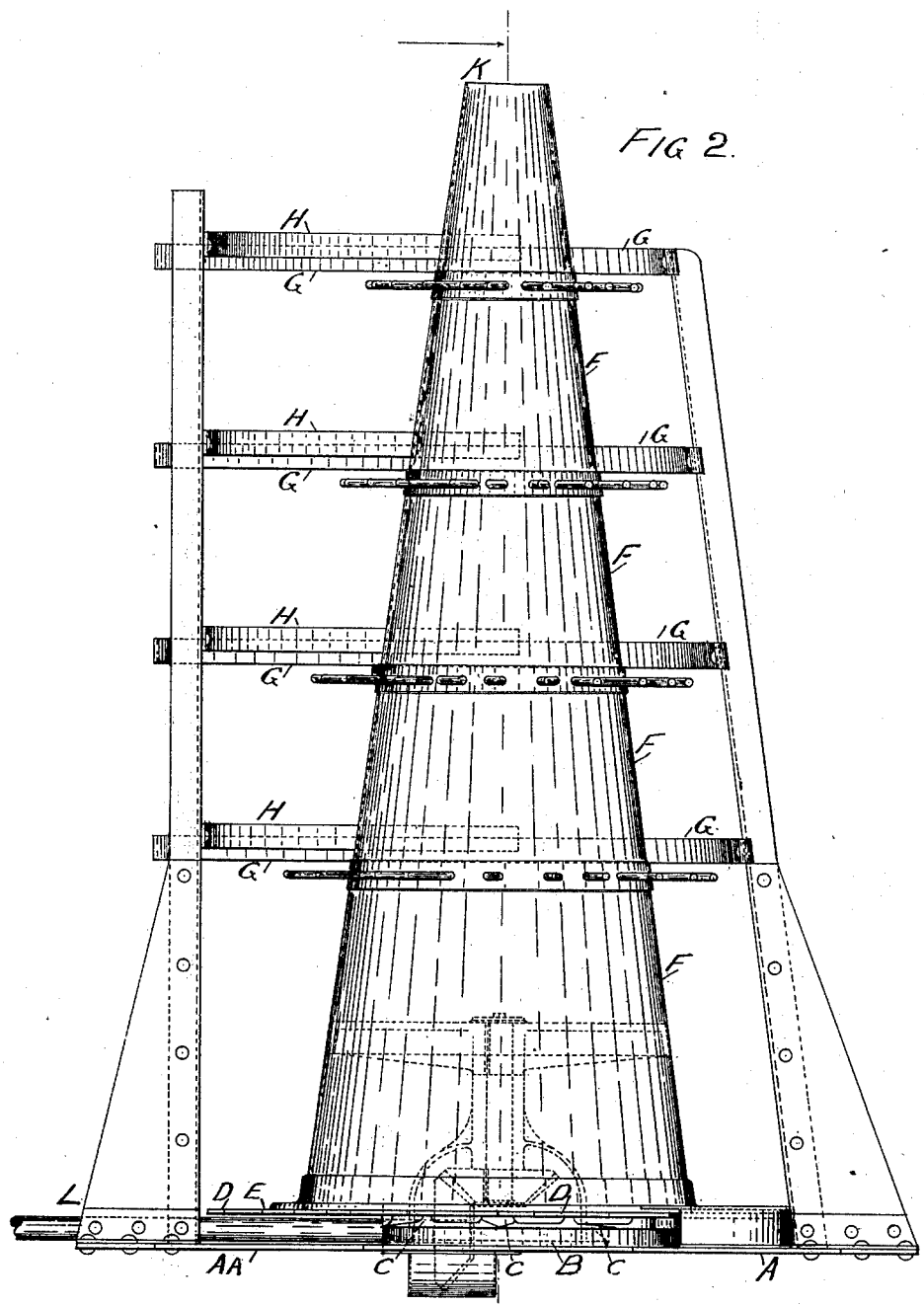

Referring to the drawings which form a part of this specification, Figure 1 is a side elevation of the machine. Fig. 2 is a front elevation; Fig. 3, a plan, and Fig. 4 a sectional detail approximately on line 4 4 of Fig. 3.

The letters A A represent the outside guide or divider.

B is the finger-bar, to which the fingers C are attached, against which the cutter-blade D acts, and thereby cuts the corn.

E is the balance-wheel, which is fixed to the cone conveyer F.

The letters G represent the guide-bars around the greater part of the cone, so as to keep the corn from falling off after being cut.

The letters H represent the bars which disengage the corn on reaching the points thereof, as shown in Fig. 3.

K represents the position of the clearance-sprocket.

The letters M represent a series of slightly-curved spikes against which the corn falls as it is cut and is carried around by the motion of the cone until it reaches the disengaging-bars H, at which point the corn is thrown out into the binder.

N represents the casing under which the cutters run after having passed the fingers C.

The main feature of the invention is the cutter and conveyer, which will reap the corn and convey it direct to the binder, where it will be bound and delivered onto the ground without any dragging or hauling the heavy stalks by means of chains or reciprocating packers.

The main frame will be much the same as those used on grain-binders and corn-harvesters. To the inner side of the main frame a >-shaped guide is attached to act as a guide between the row of corn being cut and the row standing next to it. A similar guide will be attached to the main frame ten or twelve inches from the first guide, these guides being marked, respectively, A and A' on Fig. 3. Between these guides and fixed to the frame are the finger-bars B, which are convex in shape. To these bars are fixed the fingers, (marked C.)

The actual cutting of the corn is performed by the blades D, which are attached to a balance-wheel E, having a horizontal rotary motion, forcing the corn against the finger-bars B and passing through the fingers C, the cutter-blades being three inches in length. The corn as it is cut will fall against the cone conveyer F and rest against the short curved spikes or arms M, and thus it is conveyed until it reaches the disengagers H, where it is thrown out into position ready for binding. The cone conveyer F has a flat external base extending, say, four inches from the base of the cone proper and attached to the same balance-wheel as the cutter-blades, the center of the cone being the same as that of the balance-wheel. The forward motion of the wheel will cause the butts of the cornstalks to move backward on the extended base of the cone, and the heads of the corn or cobs will fall backward on the cone itself, resting against the spikes above described, and in order to prevent the stalks slipping off the extended base of the cone such base will be corrugated or ribbed. In order to prevent the stalks from slipping off while in motion, a series of guide-bars G are fixed around the part of the cone starting from the guide A and ending at the position on the frame where the corn is thrown out for binding. These guide-bars are fixed from three to four inches from the external surface of the cone.

The disengaging-bars H are fixed on the frame at the rear of the divider A A and at the back of the machine near the outfall, and these are run so as to meet and form the disengaging-points, so as to throw out the corn from the spikes M. These disengaging-bars serve the further purpose of directing the material to the binder after the same has been disengaged or taken off the cone. These bars G and H will be so trained as to cause the stalks to fall off directly into the binder in a horizontal position, the binder itself being carried at the rear of the machine on rails attached to the main frame at right angles with the traveling wheel and parallel with the rear frame of the machine.

We claim as our invention—

1. In combination, a cutter-bar, a cone arranged on a vertical axis to receive cornstalks from the cutter-bar, arms carried by the cone and guide-bars having their inner ends approximately at the surface of the cone and extending away therefrom to remove the cornstalks, said bars being disposed at different heights along the cone and located approximately at the same distance from the surface thereof, substantially as described.

2. In a corn-harvester, a frame having an open front, guides or dividers for the corn projecting forward therefrom, a stationary cutter-bar between said guides, a rotary cutting-wheel having cutters coacting with the said cutter-bar, a cone surmounting said cutting-wheel and concentric therewith, arms carried by said cone, and guide-bars partially encircling said cone, and bars having their inner ends approximately at the surface of the cone and extending away therefrom to disengage the corn from the cone, substantially as described.

In witness whereof we have hereunto set our hands in presence of two witnesses.

DAVID DALLAS JOLLY.
ASCOT ERNEST FIRMAN.

Witnesses:
WALTER CHUBB,
J. M. ENSLER.